Patented Nov. 16, 1943

2,334,669

UNITED STATES PATENT OFFICE 2,334,669

MONO-ACYL DERIVATIVES OF 2-METHYL-1,4-NAPHTHOHYDROQUINONE

Gustaf H. Carlson, Pearl River, and Bernard R. Baker, Nanuet, N. Y., assignors to Lederle Laboratories, Inc., New York, N. Y., a corporation of Delaware No Drawing. Application November 1, 1941, Serial No. 417,474

4 Claims. (Cl. 260—479)

This invention relates to monocarboxylic mono-acyl derivatives of 2-methyl-1,4-naphthohydroquinone, and more specifically relates to the mono-acetate of 2-methyl-1,4-naphthohydroquinone.

One of the most active anti-hemorrhagic compounds of the vitamin K type is 2-methyl-1,4-naphthoquinone, and it, as well as some of its derivatives, is very widely used in the treatment of hypoprothrombinemia and the hemorrhagic diathesis of the newly born and in the treatment of post-operative bleeding in jaundice or persons having prothrombin deficiencies.

For some uses 2-methyl-1,4-naphthoquinone or derivatives such as 2-methyl-1,4-napthohydroquinone are not particularly desirable. For example, in the multi-vitamin type preparations there may be undesirable inter-reactions when the synthetic 2-methyl-1,4-naphthohydroquinone is incorporated therein. It is desirable, therefore, that a derivative of 2-methyl-1,4-naphthohydroquinone be provided which is suitable for combination with other vitamins.

The di-acetate of 2-methyl-1,4-naphthohydroquinone has been prepared in the past and there is evidence to indicate that the di-acetate has only about half the anti-hemorrhagic activity of 2-methyl-1,4-naphthohydroquinone. In accordance with the present invention we have discovered that the mono-acetate of 2-methyl-1,4-naphthohydroquinone, which has not been described heretofore, has an anti-hemorrhagic activity fully equivalent to that of 2-methyl-1,4-naphthoquinone. This mono-acetate of 2-methyl-1,4-naphthohydroquinone is, at the same time, a stable product and may be safely combined with other vitamins. The mono-acetate is also useful as an intermediate for the preparation of anti-hemorrhagic mono-glycosides of 1,4-dihydroxy-2-methylnaphthalene described and claimed in the co-pending application Serial No. 417,473, filed November 1, 1941.

Suitable methods for preparing the mono-acetate of 2-methyl-1,4-napthohydroquinone will be illustrated in conjunction with the following specific examples. It should be understood, however, that these examples are given merely by way of illustration and the invention is not to be limited to the details set forth therein.

Example 1

A solution of 7.6 grams of the diacetate of 2-methyl-1,4-naphthohydroquinone in 75 cc. of methanol was treated with 2 cc. of 28% ammonia water. After twenty-four hours at room temperature the product was precipitated with water and the organic solid was dissolved in chloroform. The chloroform solution was concentrated and the mono-acetate crystallized by dilution with petroleum ether, m. p. 125.5–126.5° C. uncorrected.

Example 2

In a slightly modified process a mixture of 50 grams of 2-methyl-1,4-naphthoquinone, 15 grams of anhydrous sodium acetate, 100 mg. of platinum oxide catalyst and 150 cc. of acetic anhydride was shaken in an atmosphere of hydrogen until one mole equivalent of hydrogen had been absorbed. Acetic anhydride (100 cc.) and 1 gram of zinc dust were added and the mixture was boiled for fifteen minutes. The filtered solution was added to cold water, the precipitated di-acetate was filtered off and treated with 22 cc. of 28% ammonia water in 450 cc. of methanol at 45° C. After twenty hours in an atmosphere of nitrogen and at room temperature, the product was precipitated with water and dissolved in chloroform. The solution was washed with water, evaporated to a small volume in vacuo and the mono-acetate was crystallized by addition of carbon tetrachloride. After several hours at 5° C. the product was filtered off and washed with carbon tetrachloride until the filtrate was colorless. Yield of mono-acetate, 42 grams, m. p. 124.5–125.8° C. uncorrected.

In the process it is not essential that the de-acetylation be carried out with aqueous ammonia and the reaction may be effected with ammonia in an alcoholic medium, in which case comparable over-all yields are obtained.

The mono-acetate of 2-methyl-1,4-naphthohydroquinone is our preferred mono-acyl derivative because of its cheapness and outstanding anti-hemorrhagic activity. The process of our invention, however, may be utilized for the preparation of the monocarboxylic mono-acyl derivatives of 2-methyl-1,4-naphthohydroquinone generally. Hence, the monocarboxylic mono-acyl derivatives of 2-methyl-1,4-naphthohydroquinone, such as for example the mono-propionate, mono-butyrate, mono-benzoate, or other mono-aliphatic monocarboxylic or mono-aromatic monocarboxylic acid derivatives, may be prepared by starting with the appropriate monocarboxylic di-acyl derivative of 2-methyl-1,4-naphthohydroquinone.

We claim:

1. A method of preparing a monocarboxylic mono-acyl derivative of 2-methyl-1,4-naphthohydroquinone which comprises subjecting a monocarboxylic di-acyl derivative of 2-methyl-1,4-naphthohydroquinone to a treatment with a dilute solution of ammonia to selectively hydrolyze one of the mono-acyl groups and recovering the resulting monocarboxylic mono-acyl derivative of 2-methyl-1,4-naphthohydroquinone from the reaction mixture.

2. A method of preparing the mono-acetate of 2-methyl-1,4-naphthohydroquinone which comprises subjecting the di-acetate of 2-methyl-1,4-naphthohydroquinone to a treatment with ammonia resulting in the removal of one of the acetate groups by selective hydrolysis and recovering the mono-acetate of 2-methyl-1,4-naphthohydroquinone from the reaction mixture.

3. A method of preparing the mono-acetate of 2-methyl-1,4-naphthohydroquinone which comprises selectively hydrolyzing one of the acetyl groups of di-acetyl 2-methyl-1,4-naphthohydroquinone by treatment with an alcoholic aqueous solution of ammonia in an atmosphere of nitrogen.

4. The mono-acetate of 2-methyl-1,4-naphthohydroquinone.

GUSTAF H. CARLSON.
BERNARD R. BAKER.